(12) United States Patent
Momochi et al.

(10) Patent No.: US 7,489,861 B2
(45) Date of Patent: Feb. 10, 2009

(54) CAMERA SYSTEM, CAMERA AND INTERCHANGEABLE LENS

(75) Inventors: Nobuchika Momochi, Kanagawa (JP); Takashi Kameyama, Kanagawa (JP); Koji Suzuki, Kanagawa (JP); Hirotsugu Terada, Kanagawa (JP)

(73) Assignee: Sony Corporation (JP)

( * ) Notice: Subject to any disclaimer, the term of this patent is extended or adjusted under 35 U.S.C. 154(b) by 261 days.

(21) Appl. No.: 10/549,130

(22) PCT Filed: Mar. 26, 2004

(86) PCT No.: PCT/JP2004/004257

§ 371 (c)(1),
(2), (4) Date: Sep. 16, 2005

(87) PCT Pub. No.: WO2004/088411

PCT Pub. Date: Oct. 14, 2004

(65) Prior Publication Data

US 2006/0072912 A1 Apr. 6, 2006

(30) Foreign Application Priority Data

Mar. 28, 2003 (JP) ............................. 2003-092348

(51) Int. Cl.
*G03B 17/00* (2006.01)
(52) U.S. Cl. ............................. 396/52; 396/55; 396/75; 396/342
(58) Field of Classification Search .................. 396/55, 396/342, 75, 52
See application file for complete search history.

(56) References Cited

U.S. PATENT DOCUMENTS 5,161,026 A * 11/1992 Mabuchi et al. .......... 348/222.1

(Continued)

FOREIGN PATENT DOCUMENTS

JP 49-021740 B 6/1974

(Continued)

OTHER PUBLICATIONS

International Search Report mailed May 18, 2004.

(Continued)

*Primary Examiner*—Rochelle-Ann J Blackman
*Assistant Examiner*—Michael A Strieb
(74) *Attorney, Agent, or Firm*—Rader Fishman & Grauer PLLC; Ronald P. Kananen

(57) ABSTRACT

A camera system (1) is provided which includes an interchangeable lens (40) including a group of lenses (L1, L2, L3, L4) for imaging an object, and a camera (10) to which the interchangeable lens (40) is to be installed. The camera (10) includes a correction angle information calculating means (20) for calculating correction angle information as to the posture of the camera (10), and a first sending means (29) for sending calculated correction angle information to the interchangeable lens (40). The interchangeable lens (40) includes the lens (L2) which optically corrects angular shift on the basis of the correction angle information sent by the first sending means (29).

37 Claims, 8 Drawing Sheets

U.S. PATENT DOCUMENTS

| | | | |
|---|---|---|---|
| 5,386,264 A * | 1/1995 | Sekine et al. | 396/55 |
| 5,479,236 A * | 12/1995 | Tanaka | 396/55 |
| 5,537,185 A * | 7/1996 | Ohishi et al. | 396/55 |
| 5,623,705 A * | 4/1997 | Ohishi et al. | 396/55 |
| 5,687,399 A * | 11/1997 | Kai et al. | 396/55 |
| 5,771,403 A * | 6/1998 | Imada | 396/52 |
| 5,842,054 A * | 11/1998 | Suzuki et al. | 396/55 |
| 6,112,027 A * | 8/2000 | Sekine et al. | 396/52 |
| 2001/0031141 A1* | 10/2001 | Izukawa | 396/55 |
| 2001/0043809 A1* | 11/2001 | Sato et al. | 396/52 |

FOREIGN PATENT DOCUMENTS

| | | |
|---|---|---|
| JP | 60-143330 A | 7/1985 |
| JP | 05-066445 | 3/1993 |
| JP | 05-289139 | 11/1993 |
| JP | 06-250272 | 9/1994 |
| JP | 07-191355 | 7/1995 |
| JP | 07-294987 | 11/1995 |
| JP | 09-080506 | 3/1997 |
| JP | 09-080511 | 3/1997 |
| JP | 09-105971 | 4/1997 |
| JP | 09-318872 | 12/1997 |
| JP | 10-039358 | 2/1998 |
| JP | 10-186435 | 7/1998 |
| JP | 2000-185403 A | 7/2000 |
| JP | 2001-350190 | 12/2001 |
| JP | 2002-079668 | 3/2002 |
| JP | 2002-192727 | 7/2002 |
| JP | 2003-084353 | 3/2003 |

OTHER PUBLICATIONS

Japanese Office Action issued Oct. 28, 2008 for corresponding Japanese Application No. 2008-9759.

* cited by examiner

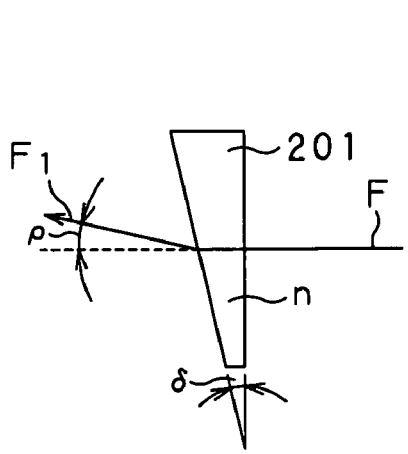
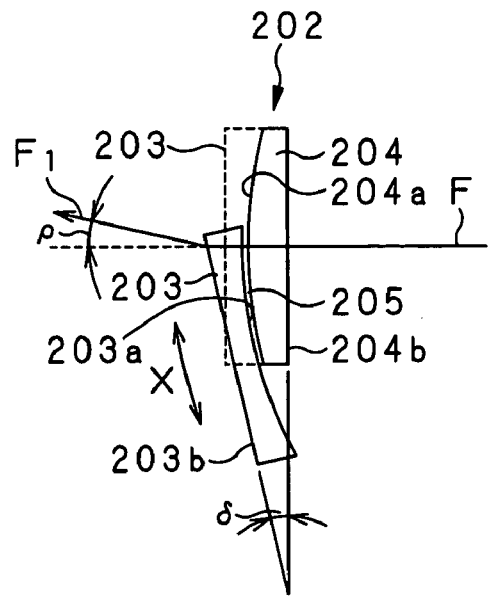
FIG.9A    FIG.9B
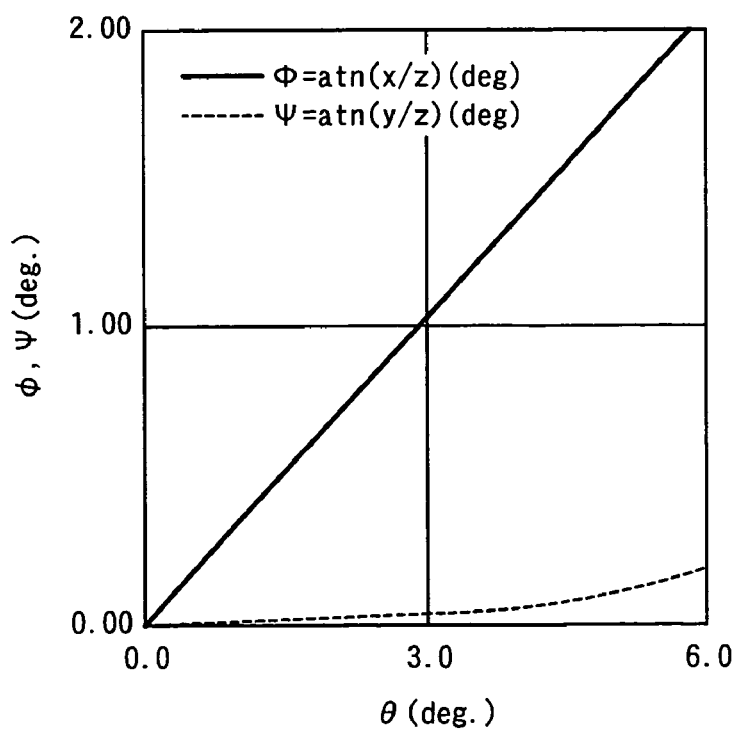
FIG.12

CAMERA SYSTEM, CAMERA AND INTERCHANGEABLE LENS

TECHNICAL FIELD

The present invention generally relates to a camera system that uses a lens freely interchangeable by the camera user as necessary, and more particularly to a camera system in which a shake of a lens-interchangeable camera can be corrected during shooting, camera and an interchangeable lens.

This application claims the priority of the Japanese Patent Application No. 2003-092348 filed on Mar. 28, 2003, the entirety of which is incorporated by reference herein.

BACKGROUND ART

Some of the conventional video cameras and still cameras have installed therein a camera-shake correcting function to correct a camera shake caused by a tremble of the camera user's hand holding the camera during shooting. Normally, the camera shake is corrected by image processing with the use of a CCD (charge-coupled device) imaging device or by optically correcting the optical axis displaced due to the camera shake.

It is proposed in the Japanese Patent Application No. 143330 of 1985 to detect an angular velocity applied to a camera by a small, inexpensive vibration gyro sensor, calculating an angular displacement from the detected angular velocity and controlling horizontal and vertical transfer of the CCD imaging device on the basis of the calculated angular displacement or moving a reflecting mirror to correct the optical axis or remove image blur caused by a vibration applied to the camera.

It is said that the optical correction of the optical axis displaced due to a camera shake is capable of a higher-quality imaging than the correction of the camera shake by image processing with the use of a CCD (charge-coupled device) imaging device because it can assure a blur-free image of an object. The optical axis displacement can be optically corrected by a so-called "shift lens system" in which part of an optical imaging lens is shifted in two directions perpendicular to the optical axis of an image pickup lens to shift the optical axis in order to move an image or by a "variable (apex) angle prism (VAP) system" using a VAP which shifts the optical axis by changing the apex angle.

The U.S. Pat. No. 3,212,420 discloses an example of the VAP system in which two transparent plates of a liquid-filled VAP, having a liquid filled between them, are tilted to change the apex angle of the prism for correcting the optical axis. Also, there is also known a VAP system in which a concave lens and convex lens having negative and positive curvatures, respectively, which are generally equal in magnitude to each other, and which are coupled with each other with their curved surfaces being opposite to each other (this lens combination is generally known as "Boskovice wedge") are rotated about the center of their curvature to change the apex angle. The Japanese Examined Patent Application No. 5987 of 1969 discloses an example of the latter VAP system.

Also, the Japanese Patent Application Laid Open No. 294987 of 1995 proposes a concrete controlling method for shake correction in which a liquid-filled VAP is adopted as a shake-correcting optical system.

In the shift lens system, a group of lenses designed relatively small and lightweight may be used as a shift lens. In the VAP system, especially, the VAP system in which a liquid-filled VAP is used, there will occur a viscous resistance because the apex angle is changed by moving the liquid between glass sheets of the liquid-filled VAP. However, there will not take place any such viscous resistance in the shift lens system. Thus, the shift lens system is advantageous in that the entire apparatus can be designed small and a shake having high frequency components can easily be corrected.

In the shift lens system, however, since an image is moved by decentering the lens, an aberration will take place due to the lens decentering. Therefore, to prevent an image being deteriorated in quality due to such lens decentering, it is necessary to limit the image moving range, that is, the shake-correctable range.

On the other hand, in the shake correction by the VAP, bending the optical axis by the prism will cause chromatic aberration but it is said that the optical axis can be bent more largely than in the shift lens system.

Note however that the liquid-filled VAP has to be driven with a force overcoming the viscous resistance of the liquid for changing the apex angle and this VAP system is likely to be influenced by an environmental change such as pressure change.

In the VAP as a combination of concave and convex lenses, the radius of rotation of the lens is large, which will lead to a larger size of the entire apparatus, and thus, the VAP has not become popular. However, the Japanese Patent Application Laid Open No. 39358 of 1998 proposes to avoid any larger size of the entire apparatus by using a VAP that has a mechanism to rotate the combined concave and convex lenses while supporting each of the lenses at either end thereof in order to change the apex angle.

As above, there are proposed and used various optical shake-correcting techniques in practice. However, because of their differences in optical system from each other, they cannot be said to be advantageous in all cases. Therefore, it is desirable for the user of the camera that such optical shake-correcting techniques can selectively be adopted depending upon his or her intended imaging or exposure conditions.

The above requirement can be met by providing a camera body incorporating a lens-interchangeable camera system. In the optical shake-correcting system, the function of shake correction is provided on each interchangeable lens having an optical imaging system. Therefore, the camera body can use various optical shake-correcting systems by selecting an interchangeable lens depending upon intended exposure conditions.

Generally, correction of a camera shake needs at least a sensor to detect the camera shake, a calculation-controlling system to calculate a signal which activates a correcting optical system on the basis of the detected camera shake, and a driving system to actually operate the correcting optical system on the basis of the signal.

The correcting optical system is installed on an interchangeable lens, and so the driving system should be installed in the interchangeable lens. Also, the sensor and calculation-controlling system can be installed in the interchangeable lens, but since the correction-controlling system is changed from one to another each time the interchangeable lens is replaced, no constant operability of the camera body will not be assured through operations of shake correction.

If the sensor is left in the interchangeable lens while the calculation-controlling system is installed in the camera body in order to assure such a constant operability of the camera body, a signal from the sensor in the interchangeable lens is passed to the calculation-controlling system on the camera body and then sent to the driving system in the interchangeable lens. Thus, the signal communication will be complicated, and an interface will be required for the signal communication, resulting in an extremely inefficient camera system.

Therefore, the camera system should desirably have a configuration in which the sensor and calculation-controlling system are installed in the camera body and the driving system to drive the correcting optical system is installed in the interchangeable lens. Thus, there will be described below various camera systems in which the sensor and calculation-controlling system are installed in the camera body and the driving system to drive the correcting optical system is installed in the interchangeable lens.

The Japanese Patent Application Laid Open No. 105971 of 1997 proposes a camera system in which a shift lens system is adopted as a correcting optical system and a shift of a shift lens is calculated in a camera body and sent to an interchangeable lens.

Also, the Japanese Patent Application Laid Open No. 66445 of 1993 proposes a camera system in which a drive signal to drive a correcting optical system is calculated by a camera body from an angular velocity signal detected by the sensor and sent to an interchangeable lens.

Also, the Japanese Patent Application Laid Open No. 80511 of 1997 proposes a camera system in which an angular displacement signal detected by a sensor in a camera body is sent as a digital signal to an interchangeable lens.

Also, the Japanese Patent Application Laid Open No. 250272 of 1994 proposes a camera system in which a shift lens system is adopted as a correcting optical system.

Also, the Japanese Patent Application Laid Open No. 186435 of 1998 proposes a camera system in which a VAP as a combination of concave and convex lenses, as disclosed in the Japanese Patent Application Laid Open No. 39358 of 1998, is adopted as a correcting optical system and a control method of removing an error component caused when the apex angle of the VAP is changed is adopted.

As above, there has been proposed a plurality of correcting techniques in correcting optical systems different from each other for the purpose of optical shake correction. Naturally, the control methods for the shake correction are different from each other because they depend upon the correcting systems adopted therein. Therefore, even in a camera system designed to use a correcting optical system for each of interchangeable lenses so that the camera body can be used with every shake-correcting function, it should include a correcting system for each of the correcting systems.

In the camera systems each with the optical shake-correcting function, proposed in the Japanese Patent Application Laid Open Nos. 105971 of 1997, 66445 of 1993, 80511 of 1997, 250272 of 1994 and 186435 of 1998, respectively, the interchangeable lenses are used but the correcting optical system is exclusive to either the shift lens system or the VAP system. Namely, the camera system is low in versatility and the user of the camera system cannot select the advantages of the above-mentioned correcting optical systems. Therefore, the camera system will not be able to accommodate any correcting optical system based on a new principle at all.

DISCLOSURE OF THE INVENTION

Accordingly, the present invention has an object to overcome the above-mentioned drawbacks of the related art by providing an improved and novel camera system, camera and interchangeable lens.

The present invention has a more concrete object to provide a camera system, camera and interchangeable lens, capable of accommodating any correcting optical system which optically corrects a camera shake.

The above object can be attained by providing a camera system including an interchangeable lens having an optical imaging means for imaging an object and a camera to which the interchangeable lens is to be installed, wherein the camera includes a correction angle information calculating means for calculating correction angle information as to camera posture; and a first sending means for sending the correction angle information calculated by the correction angle information calculating means to the interchangeable lens, and the interchangeable lens includes an optical correcting means for optically correcting an angular shift of the camera system on the basis of the correction angle information sent from the first sending means.

Also the above object can be attained by providing a camera to which an interchangeable lens having an optical imaging means for imaging an object is to be installed, wherein it includes a correction angle information calculating means for calculating correction angle information as to camera posture; and a first sending means for sending the correction angle information calculated by the correction angle information calculating means to the interchangeable lens.

Also the above object can be attained by providing an interchangeable lens having an optical imaging means for imaging an object and which is to be installed to a predetermined camera, wherein it includes a receiving means for receiving correction angle information sent from the camera; and an optical correcting means for optically correcting an angular shift of the camera on the basis of the correction angle information received by the receiving means.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 9A and 9B explain the principle of a tablet type variable angle prism.

FIG. 12 schematically illustrates the error component in the tablet type VAP.

BEST MODE FOR CARRYING OUT THE INVENTION

Figure 1:
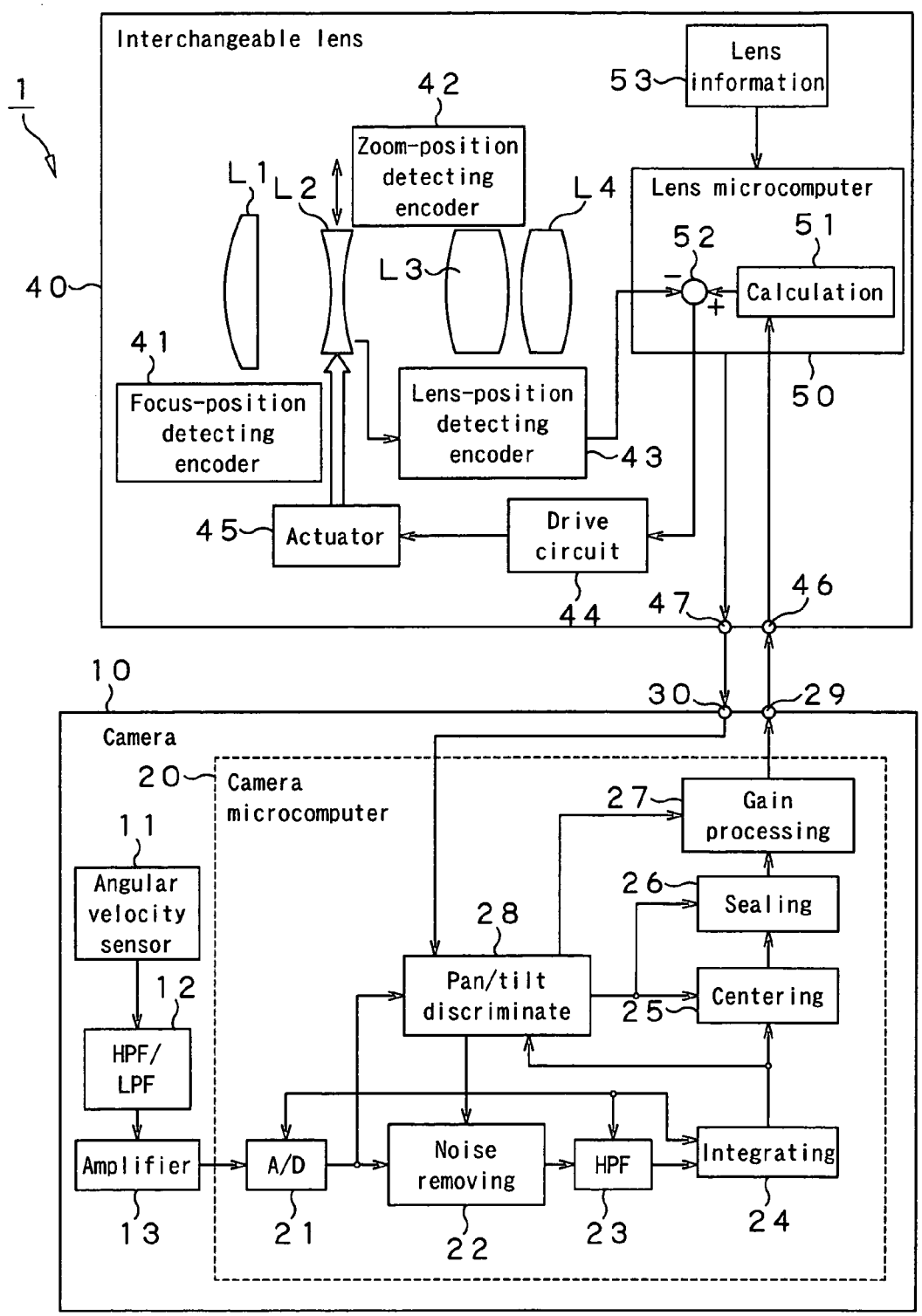
FIG. 1 is a block circuit diagram of the camera system as a first embodiment of the present invention.

The present invention will be described in detail below concerning camera systems, cameras and interchangeable lenses, as the embodiments of the present invention with reference to the accompanying drawings.

First, the first embodiment of the camera system according to the present invention will be described with reference to FIG. 1. The camera system is generally indicated with a reference numeral 1.

As shown in FIG. 1, the camera system 1 according to the present invention includes a camera 10 as the body of the camera system 1, and an interchangeable lens 40 which is to be installed to the camera 10. The camera system 1 has installed therein a shake correcting function to correct a shake given to the camera system 1, for example, a camera shake caused by a tremble of the camera user's hand holding the camera system 1.

First, the camera 10 will be explained below. The camera 10 includes an angular velocity sensor 11, HPF/LPF (high-pass filter/low-pass filter) 12, amplifier 13 and a microcomputer 20 (will be referred to as "camera microcomputer" hereunder).

The angular velocity sensor 11 is a vibration gyro sensor to detect a shake of the camera 10 in two directions perpendicular to the optical axis of the camera 10. The "two directions perpendicular to the optical axis" are a vertical component perpendicular to the optical axis (pitching direction) and a horizontal component perpendicular to the optical axis (yawing direction), respectively. It should be noted that although only one angular velocity sensor 11 is illustrated in FIG. 1, the camera 10 actually includes the angular velocity sensors 11 to detect an angular velocity signal in each of the above-mentioned two directions.

Note that the angular velocity sensors 11 do not have to be provided in the camera 10 but they may be disposed for the angular velocity signals to be supplied to the HPF/LPF 12. For example, the angular velocity sensors 11 may be installed on a vehicle to detect the vibration of the vehicle. That is, the shake to be detected by the angular velocity sensor 11 is not limited only to the so-called camera shake.

Also, a sensor to detect an imaging direction of the camera 10 may be used in place of the angular velocity sensor 11.

In the HPF/LPF 12, DC offset component included in an angular velocity signal detected by the angular velocity sensor 11 is removed by the HPF (high-pass filter) part, and a component having a higher frequency than the frequency band sampled by an A-D (analog-to-digital) converter 21 included in the camera microcomputer 20, which will be described in detail later, is removed by the LPF (low-pass filter) part.

The amplifier 13 amplifies the angular velocity signal sent from the HPF/LPF 12 to a predetermined output level and sends it to the camera microcomputer 20.

The camera microcomputer 20 generates optical-correction angle information from the angular velocity signal detected by the angular velocity sensor 11, and sends it to an interchangeable lens 40 which will be described in detail later.

The camera microcomputer 20 includes the A-D converter 21, noise removing unit 22, HPF (high-pass filter) 23, integrating unit 24, centering unit 25, sealing unit 26, gain processing unit 27, and a pan/tilt discrimination unit 28.

The A-D converter 21 converts the angular velocity signal sent from the amplifier 13 into an angular velocity digital signal by sampling the angular velocity signal with a predetermined sampling frequency.

Figure 2:
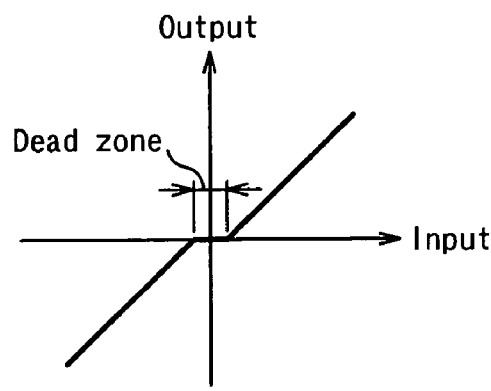
FIG. 2 explains noise removal in a noise removing unit.

The noise removing unit 22 removes noise from the minute signal component of the angular velocity digital signal sent from the A-D converter 21. The noise removing unit 22 zeros the output of the minute signal component of the input angular velocity digital signal as shown in FIG. 2. The threshold of the dead zone for zeroing the output is determined based on the discrimination by the pan/tilt discriminating unit 28 which will be described in detail later.

The HPF 23 filters out low-frequency noise such as temperature drift which cannot be removed by the noise removing unit 22 from the angular velocity signal, and sends it to the integrating unit 24.

The integrating unit 24 integrates the angular velocity digital signal sent from the HPF 23 and, having the noise removed therefrom by the noise removing unit 22 and HPF 23, calculates an angle information.

The centering unit 25 adjusts the angle signal so that the angle information calculated by the integrating unit 24 will fall within such a range of angle as can be corrected by the correcting optical system in the interchangeable lens 40, and keeps the correcting optical system in normal condition.

For example, in case the angle information calculated by the integrating unit 24 is approximate to the limits of the range of angle that can be corrected by the correcting optical system in the interchangeable lens 40, it is very likely that the correcting optical system is not able to meet requirements for correcting operation.

Figure 3:
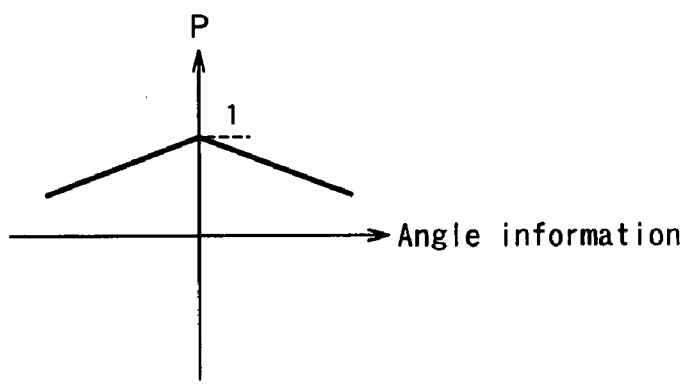
FIG. 3 explains a variable used in centering in a centering unit.

Thus, the centering unit 25 adjusts the angle signal to provide such optical-correction angle information as restores the correcting optical system to a predetermined condition in order to keep the movable range of the correcting optical system for maintaining the original optical performance of the correcting optical system. More particularly, the centering unit 25 adjusts the angle signal by multiplying the angle information calculated by the integrating unit 24 by a variable $p$ ($0<p<1$) which will be smaller each time the angle information increases in absolute value, as shown in FIG. 3, to control the gain.

The centering operation made in the centering unit 25 needs information on where the correcting optical system currently is. Since the current-position information is detected in the interchangeable lens 40, it can be acquired by communicating with the interchangeable lens 40.

Also, since angle information for correcting the correcting optical system is generated in the camera 10, it is possible to calculate a control target value from the angle information at the camera 10 and use it as current-position information required in the centering unit 25.

Figure 4:
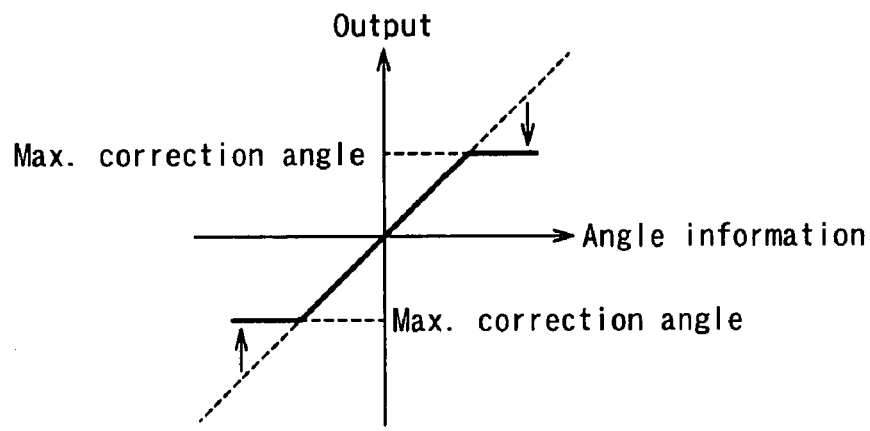
FIG. 4 explains sealing in a sealing unit.

The sealing unit 26 makes an operation required when the angle information calculated by the integrating unit 24 and centered by the centering unit 25 exceeds a maximum correction angle $\theta$max of the interchangeability lens 40. The maximum correction angle $\theta$max is calculated at the interchangeable lens 40 and sent to the camera 10. When the angle information exceeds the maximum correction angle $\theta$max, the sealing unit 26 replaces the angle information having exceeded the maximum correction angle $\theta$max with the latter, as shown in FIG. 4, and provides it as an output.

The gain processing unit 27 controls the gain for accurate sending of the angle information from the camera 10 via the sealing unit 26 to the interchangeable lens 40. The angle information sent from the camera to the interchangeable lens 40 is sent as a digital signal or an analog signal or as a value converted correspondingly to the sending format.

Generally, the maximum correction angle for the interchangeable lens depends upon the type of the individual lens, namely, upon whether the correcting optical system is the shift lens type or VAP (variable angle prism) type. For example, it is assumed here that in the correcting optical system, the maximum correction angle for the lens A is 0.3 deg. and in the VAP system, the maximum correction angle for the lens B is 2 deg.

In case the angle information is to be sent as an analog signal, once angle information per unit is determined to be 1 deg. per volt, for example, as a fixed analog signal, the voltage for the maximum correction angle in the VAP system is 2 V while that for the maximum correction angle in the shift lens system is as low as 0.3 V. Therefore, in the shift lens system, a variation of the voltage due to some noise will cause an error component to be included in angle information to be sent.

Thus, for optimally sending the angle information to the interchangeable lens 40, the gain processing unit 27 sets the gain so that a maximum value used in sending, that is, a maximum voltage for analog sending or maximum bit width for digital sending, becomes the maximum correction angle for the interchangeable lens 40. Then, the gain processing unit 27 takes angle information per unit of the transmission signal at this time as a gain value. The gain processing unit 27 divides the angle information by the gain value to generate a transmission signal. The transmission signal is sent to the interchangeable lens 40 via a terminal 29.

Also, the gain value generated by the gain processing unit 27 is sent to the interchangeable lens 40 via any other terminal, for example, a terminal 30 or the like. The gain value will be sent to the interchangeable lens 40, for example, when the interchangeable lens 40 is installed to the camera 10. That is, the gain value has already arrived at the interchangeable lens 40 when shake correction is to be made.

The gain value sent from the camera 10 to the interchangeable lens 40 and transmission signal including the angle information are indispensable for shake correction of the camera system 1. They will generically be called "optical-correction angle information".

Note that the gain value generated by the gain processing unit 27 can be changed even while the transmission signal is being sent from the camera 10 to the interchangeable lens 40. For example, when the communication condition of the transmission signal has been aggravated, the gain value can appropriately be changed to positively send the angle information under an optimum condition.

The pan/tilt discrimination unit 28 discriminates, based on an angular velocity value (such as the magnitude of the angular velocity or change of the angular velocity) detected by the angular velocity sensor 11 and supplied via the A-D converter 21, angle information (such as the magnitude of the angle) calculated by the integrating unit 24, etc., which a shake detected by the angular velocity sensor 11 is, a shake caused by an intentional operation of the camera system 1 by the user such as a pan or tilt or a camera shake to be corrected.

The pan/tilt discrimination unit 28 sets, correspondingly to the result of discrimination, a size of the dead zone in the noise removing unit 22, pass band of the HPF 23, time constant used for an operation of integration made in the integrating unit 24, etc.

Also, the pan/tilt discrimination unit 28 makes a comparison between the angle information calculated by the integrating unit 24 and a range of shake correction sent from the interchangeable lens 40 and sets a value of the variable p used in an operation of centering made in the centering unit 25. For example, when it is determined that the camera user has intentionally shifted the camera system 1 (namely, when it is determined that the camera system 1 has been panned or tilted), the pan/tilt discrimination unit 28 will set a small value of the variable p.

The terminals 29 and 30 are interfaces connected to terminals 46 and 47, respectively, of the interchangeable lens 40.

The terminal 29 is an interface to send a transmission signal including angle information to the interchangeable lens 40 as above. Since shake is detected independently in the pitching direction and yawing direction, the camera 10 has two terminals 29 (only one of which is shown in FIG. 1) which send transmission signals each including angle information independently to the interchangeable lens 40. Also, by making time-division multiplexing of the transmission signals including angle information in the pitching and yawing directions, it is also possible to send the transmissions signal by one terminal 29.

Also, the terminal 30 is an interface to receive information sent from the interchangeable lens 40, such as maximum correction angle θmax of the correcting optical system, correctable-angle range information on the correcting optical system, lens information at the time of focusing and zooming, etc.

Next, the interchangeable lens 40 will be explained. The interchangeable lens 40 in this embodiment includes four lens groups L1, L2, L3 and L4 as an imaging optical system to image an object. In the imaging optical system of the interchangeable lens 40, focusing is made by shifting the lens group L1 back and forth in the optical-axial direction, and zooming is done by shifting the lens groups L1, L2 and L3 back and forth in the optical-axial direction. It should be noted that the lens group L4 is immobilized.

The position of the lens group L1 shifted back and forth in the optical-axial direction for focusing is detected by a focus-position detecting encoder 41. Also, the positions of the lens groups L1, L2 and L3 shifted back and forth in the optical-axial direction for zooming are detected by a zoom position detecting encoder 42.

Also, in the interchangeable lens 40, the lens group L2 functions as a correction lens in the correcting optical system to make optical correction. The optical-correction system used in the interchangeable lens 40 is a shift lens system which corrects a detected shake of the camera system 1 by shifting the lens group L2 in a direction perpendicular to the optical axis correspondingly to the shake of the camera system 1. The lens group L2 thus shifted is called "shift lens" in connection with the lens shift system. Current-position information on the lens group L2 is detected by a lens-position detecting encoder 43 and sent to a microcomputer 50 for the lens (will be referred to as "lens microcomputer" hereunder).

The correcting optical system is controlled by the lens microcomputer 50 on the basis of the optical-correction angle information sent from the camera 10 to shift the lens group L2 in a direction perpendicular to the optical axis, to thereby make shake correction.

The lens microcomputer 50 includes a calculation unit 51 which calculates, based on the optical-correction angle information sent from the camera 10, correction shift position information which is a control target value for shifting the lens group L2. Further, the lens microcomputer 50 includes an adder 52 which subtracts the current-position information on the lens group L2, detected by the lens-position detecting encoder 43, from the correction shift position information which is the control target value.

The value resulted from the subtraction in the adder 52 is sent to a drive circuit 44 in which it will be converted into a control voltage. The control voltage is sent to an actuator 45 which drives the lens group L2. The actuator 45 drives the lens group L2 correspondingly to the control voltage from the drive circuit 44 to correct the shake of the camera system 1.

Next, the operation of the lens microcomputer 50 will mainly be explained concerning the shake correction of the interchangeable lens 40.

The calculation unit 51 of the lens microcomputer 50 multiplies a transmission signal including the angle information, supplied from the terminal 29 of the camera 10 via a terminal 46 of the interchangeable lens 40 and which is optical-correction angle information, by the gain value previously sent as optical-correction angle information to calculate angle information.

Then, the lens microcomputer 50 calculates a shift lens-caused image shift dIM1 corresponding to an inclination of the optical axis for the calculated angle information. When the imaging optical system is inclined through θ [rad] about the forward main point, the image shift dIM1 is given by the following equation (1):

$$dIM1 = f(1+k) \cdot \theta \quad (1)$$

where f is the focal distance of the imaging optical system and k is a magnification of imaging.

The focal distance f of the imaging optical system is known by detecting the positions of the lens groups L1, L2 and L3 by means of the zoom-position detecting encoder 42.

Also, a distance a of the object can be determined by detecting the position of the lens group L1 by means of the focus-position detecting encoder 41. For example, a table stating distances a of the object corresponding to outputs from the focus-position detecting encoder 41 and zoom-position detecting encoder 42, respectively, is held in a lens information storage unit 53 in advance, and when outputs from the encoders 41 and 42 are entered, a distance a is sent to the lens microcomputer 50.

The magnification of imaging k is determined as given by the following equations (2) and (3) from the focal distance and object distances f and a:

$$1/f = (1/a) + (1/b). \quad (2),$$

$$k = a/b \quad (3).$$

Thus, the lens microcomputer 50 uses the equation (2) to calculate a distance b and imaging magnification k from the distance a and focal distance f. Further, the lens microcomputer 50 uses the equation (1) to calculate a shift of image dIM1 from the imaging magnification k and angle information θ.

On the other hand, on the assumption that the image shift when the lens group L2 is shifted to a shift lens position d is dIM1', the ratio between d and dIM1' will vary depending upon the focal distance f and imaging magnification k. The ratio is held as a sensitivity to decentering Sd as will be described in detail later:

$$dIM' = Sd \cdot d = Sd(f,k) \cdot d \quad (4).$$

Since an image shift dIM1 corresponding to a shake as angle information to be corrected is determined using the equation (1), and the relation between the shift d of the shift lens and image shift dIM1' is given as the equation (4), the shift lens position d for shake correction is given by a function of the angle information θ as in the following equation (5):

$$d = \{f(1+k) \cdot \theta / Sd(f,k)\} \quad (5).$$

The shift lens position d is correction shift position information which is a control target value. The calculated correction shift position information is sent to the adder 52 of the lens microcomputer 50. The adder 52 subtracts current-position information on the lens group L2 detected by the position detecting encoder 43 from the correction shift position information to calculate a controlled variable for the lens group L2.

Thus, in the correcting optical system for the interchangeable lens 40, the equation (5) is used by the calculation unit 51 in the lens microcomputer 50 to calculate, based on the optical-correction angle information sent from the camera 10, the correction shift position information d which is a control target value, and the current-position information on the lens group L2, detected by the position detecting encoder 43, is fed back for the shift lens position d to approximate the control target value, thereby correcting a shake of the camera system 1.

Note that the focal distance f and sensitivity to decentering Sd as a function of the imaging magnification k are stored as a table in the lens information storage unit 53, for example, and the focal distance f and imaging magnification k are calculated by the lens microcomputer 50 to determine a corresponding sensitivity to decentering Sd(f, k).

Next, there will be explained the information sent from the interchangeable lens 40 to the camera 10. The interchangeable lens 40 receives the optical-correction angle information from the camera 10 as mentioned above, and sends information on a correctable range of angle of the correcting optical system and information on the interchangeable lens 40 when the latter has the state thereof changed by focusing by the user, user-supporting functions such as auto-focusing, zooming, etc. to the camera 10. The interchangeable lens information is sent to the camera 10 via the terminal 30 of the camera 10, connected to the terminal 47 of the interchangeable lens 40.

The interchangeable lens information includes maximum correction angle θmax necessary for determining optical-correction angle information. The maximum correction angle θmax can be calculated as given by the following equation (6) including a focal distance f of the imaging optical system, imaging magnification k, sensitivity to decentering Sd, and a maximum angle dmax for which the lens group L2 which is a shift lens can physically be shifted within the interchangeable lens 40:

$$\theta max = dmax \cdot Sd(f,k) / \{f(1+k)\} \quad (6).$$

In addition to the above maximum correction angle θmax, depending upon a physical movable range of the shift lens, a maximum correction angle is set in order to keep the optical function at a higher level than in normal use. Such a maximum correction angle is held in a table corresponding to the focal distance, imaging magnification, etc., and is referred to as necessary.

The maximum correction angle θmax is calculated at constant time intervals and sent to the camera 10, or it is sent to the camera 10 when the maximum correction angle θmax is changed. The maximum correction angle θmax is sent to the camera microcomputer 20 in which it will be used in the sealing unit 26, pan/tilt discrimination unit 28, etc.

Next, the second embodiment of the camera system according to the present invention will be described with reference to FIG. 5. The camera system is generally indicated with a reference numeral 2.

Figure 5:
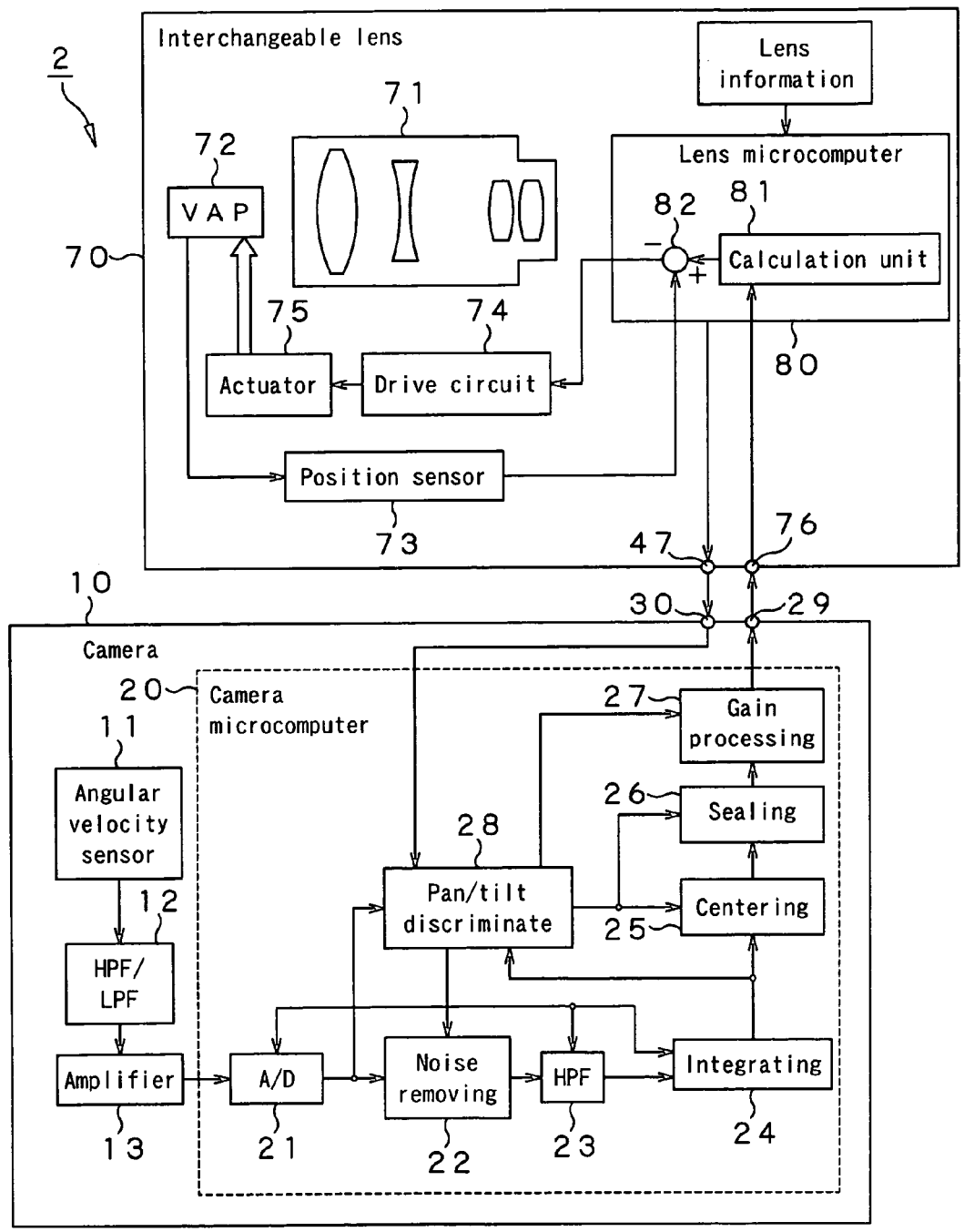
FIG. 5 is a block circuit diagram of the camera system as a second embodiment of the present invention.

As shown in FIG. 5, this camera system 2 includes a camera 10 as a camera body, and an interchangeable lens 70 to be installed to the camera body. The camera system 2 has installed therein a shake correcting function to correct a shake given to the camera system 2 similarly to the camera system 1, for example, a camera shake caused by a tremble of the camera user's hand holding the camera during shooting.

Note that the camera 10 in the camera system 2 is exactly the same in construction as that having been described with reference to FIG. 1 and so elements of the camera 10 will be indicated with the same reference numerals as those in FIG. 1 and will not be explained in detail. When a shake is detected by an angular velocity sensor 11 in the camera 10, optical-correction angle information is generated by a camera microcomputer 20 and sent to an interchangeable lens 70.

Next, the interchangeable lens 70 will be explained. The interchangeable lens 70 includes a lens unit 71 as an imaging optical system to image an object, and a liquid-filled VAP (variable angle prism) 72 as a correcting optical system. The optical correcting technique adopted in this interchangeable lens 70 is a VAP technique for changing the apex angle of the VAP 72 correspondingly to a detected shake of the camera system 2 to correct the shake.

The correcting optical system is controlled by a lens microcomputer 80 to change the apex angle of the VAP 72 on the basis of optical-correction angle information sent from the camera 10, thereby correcting the shake of the camera system 2.

Figure 6:
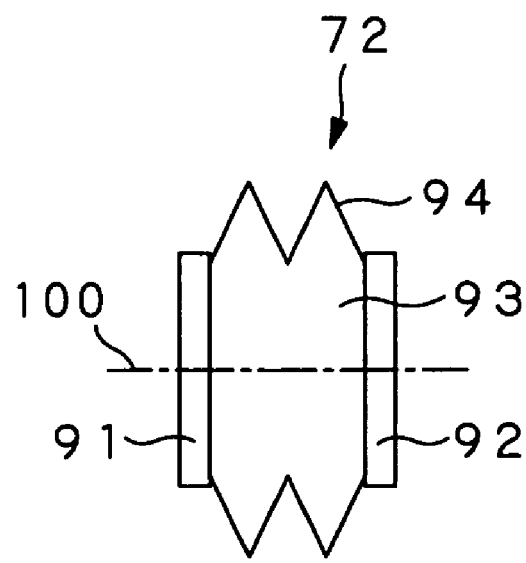
FIG. 6 is a side elevation of a liquid-filled variable angle prism (VAP).

First, the VAP 72 will be described below. As shown in FIG. 6, the VAP 72 includes two parallel transparent sheets 91 and 92 opposite to each other and between which there is filled a transparent elastic material or inactive liquid 93 having a high refractive index (n) and which is elastically sealed with a sealant 94 such as a resin film provided on the outer surface of the elastic material 93. The optical axis, indicated with a reference numeral 100, is shifted by oscillating the parallel transparent sheets 91 and 92 to correct a shake of the camera system 2.

Figure 7:
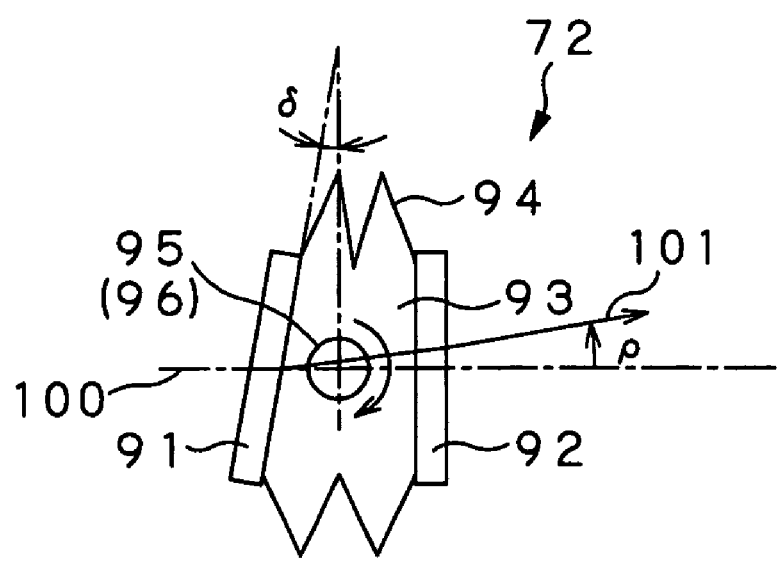
FIG. 7 is a side elevation showing shift of the optical axis in the liquid-filled VAP.

FIG. 7 shows passing of an incident beam 101 through the parallel transparent sheets 91 and 92 of the VAP 72 when one (91) of the parallel transparent sheets is rotated through an angle ρ about an oscillation/rotation shaft 95 (96). The beam 101 incident upon the transparent sheet 91 along the optical axis 100 is deflected at the angle ρ in the same principle as that of the prism. On the assumption that the apex angle is δ and the apex angle δ is small, the angle of deflection ρ can be given by the following equation (7):

$$\rho = (n-1) \cdot \delta \quad (7).$$

Angle information detected by the angular velocity sensor 11 of the camera 10 and calculated by the camera microcomputer 20 is sent as optical-correction angle information to the interchangeable lens 70.

The lens microcomputer 80 includes a calculation unit 81 which calculates, based on the optical-correction angle information sent from the camera 10, a target angular shift as a control target value to change the apex angle of the VAP 72. More specifically, the lens microcomputer 80 multiplies a transmission angle including the angle information sent as optical-correction angle information via a terminal 76 of the interchangeable lens 70 by a gain value pre-sent as the optical-correction angle information to calculate angle information. Since the calculated angle information is the amount of deflection ρ, the equation (7) is used to calculate a target angular shift δ as a control target value.

Also, the lens microcomputer 80 includes an adder 82 which subtracts the angular shift of the VAP 72, detected by a position sensor 73, from the target angular shift as the control target value.

The result of subtraction is sent from the adder 82 to a drive circuit 74 where it will be converted into a control voltage and be sent to an actuator 75 which drives the VAP 72. The actuator 75 drives the VAP 72 to change the apex angle of the latter correspondingly to the control voltage from the drive circuit 74, thereby correcting a shake of the camera system 2.

Thus, also in the camera system 2 installed to the camera 10, the interchangeable lens 70 adopting the VAP as the correcting optical system can correct a shake of the camera system 2, detected by the camera 10, by sending the detected shake of the camera system 2 as optical-correction angle information to the interchangeable lens 70.

Also, the VAP 72 in the interchangeable lens 70 is different from the shift lens technique adopted in the interchangeable lens 40 in that the optical axis is shifted directly when the apex angle is changed. So, with the VAP 72, the lens microcomputer 80 may not make any complicated operation including detection of a shake of an image and calculation, made after the detection, of correction shift position information as a control target value.

Also, since the maximum correction angle may be constant, not depending upon the focal distance and image magnification of the lens, it has only to be transmitted to the camera body from the terminal 47 of the interchangeable lens 40 when the camera system is in operation or when the interchangeable lens is installed to or removed from the camera body. However, the maximum correction angle may be transmitted to the camera at constant intervals as in the camera system adopted in the shift lens.

Next, the third embodiment of the camera system according to the present invention will be described with reference to FIG. 8. The camera system is generally indicated with a reference numeral 3.

Figure 8:
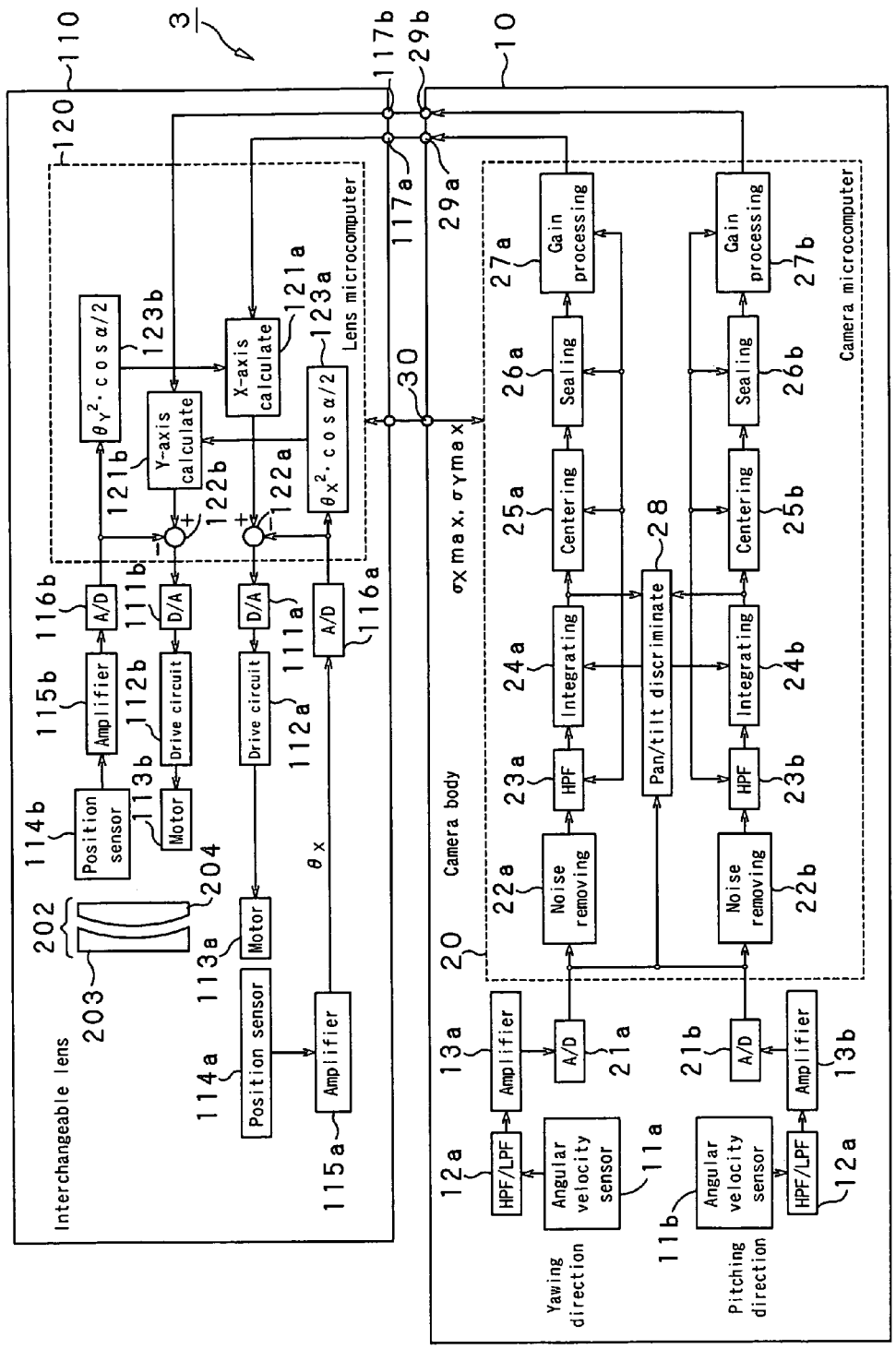
FIG. 8 is a block circuit diagram of the camera system as a third embodiment of the present invention.

As shown in FIG. 8, this camera system 3 includes a camera 10 as the camera body, and an interchangeable lens 110 to be installed to the camera body. The camera system 3 has installed therein a shake correcting function to correct a shake given to the camera system 3 similarly to the camera systems 1 and 2, for example, a camera shake caused by a tremble of the camera user's hand holding the camera during shooting.

First, the correcting optical system of the interchangeable lens 110 will be explained. The correcting optical system of the interchangeable lens 110 adopts a VAP which is different from the liquid-filled VAP used in the interchangeable lens 70 shown in FIG. 5.

The VAP used in the interchangeable lens 110 will be described. Since in the liquid-filled VAP used in the interchangeable lens 70 including glass sheets connected to each other with the sealant and in which the liquid is filled, the filled liquid provides a viscous resistance when the glass sheets are tilted and thus the liquid-filled VAP cannot easily follow a high-speed shake.

To solve the above problem, there has been proposed the tablet type VAP including a pair of spherical lenses. This tablet type VAP is used in the interchangeable lens 110.

The principle of the tablet type VAP will be explained below with reference to FIGS. 9A and 9B. FIG. 9A shows a wedge type prism 201 whose refractive index is n and apex angle is δ. As shown, in this wedge type prism 201, an outgoing optical axis F1 has a refraction angle ρ in relation to an incident optical axis F. The relation between the refraction angle ρ and apex angle δ is the same as given by the equation (7) which is shown again below:

$$\rho = (n-1) \cdot \delta \quad (7).$$

The tablet VAP 202 used in the interchangeable lens 110 includes a plano-concave spherical lens 203 and plano-convex spherical lens 204 as shown in FIG. 9B.

The plano-concave lens 203 and plano-convex lens 204 have a refractive index n, and have spherical surfaces 203a and 204a, respectively, which are equal in radius of curvature to each other. The spherical surfaces 203a and 204a are opposite to each other with a small gap 205 being kept between them.

In the tablet type VAP 202, when planes 203b and 204b of the plano-concave lens 203 and plano-convex lens 204, respectively, are parallel to each other, light will not be deflected as indicated with the dashed line in FIG. 9B.

When the plano-concave lens 203 and plano-convex lens 204 are rotated in relation to each other along their respective spherical surfaces 203a and 204a in the direction of arrow X as indicated with a solid line to form an apex angle δ between the planes 203b and 204b, outgoing light F1 is deflected in relation to incident light F as given by the equation (7) as in the wedge type prism 201.

By rotating the plano-concave lens 203 and plano-convex lens 204 along their respective spherical surfaces 203a and 204a in relation to each other in two axial directions perpendicular to each other and freely controlling the angle of rotation, the direction of deflection and angle of deflection p of the outgoing light F 1 can freely be changed upward, downward, rightward or leftward.

Next, the operation of the tablet type VAP 202 used in the interchangeable lens 110 will be explained with reference to FIG. 10.

Figure 10:
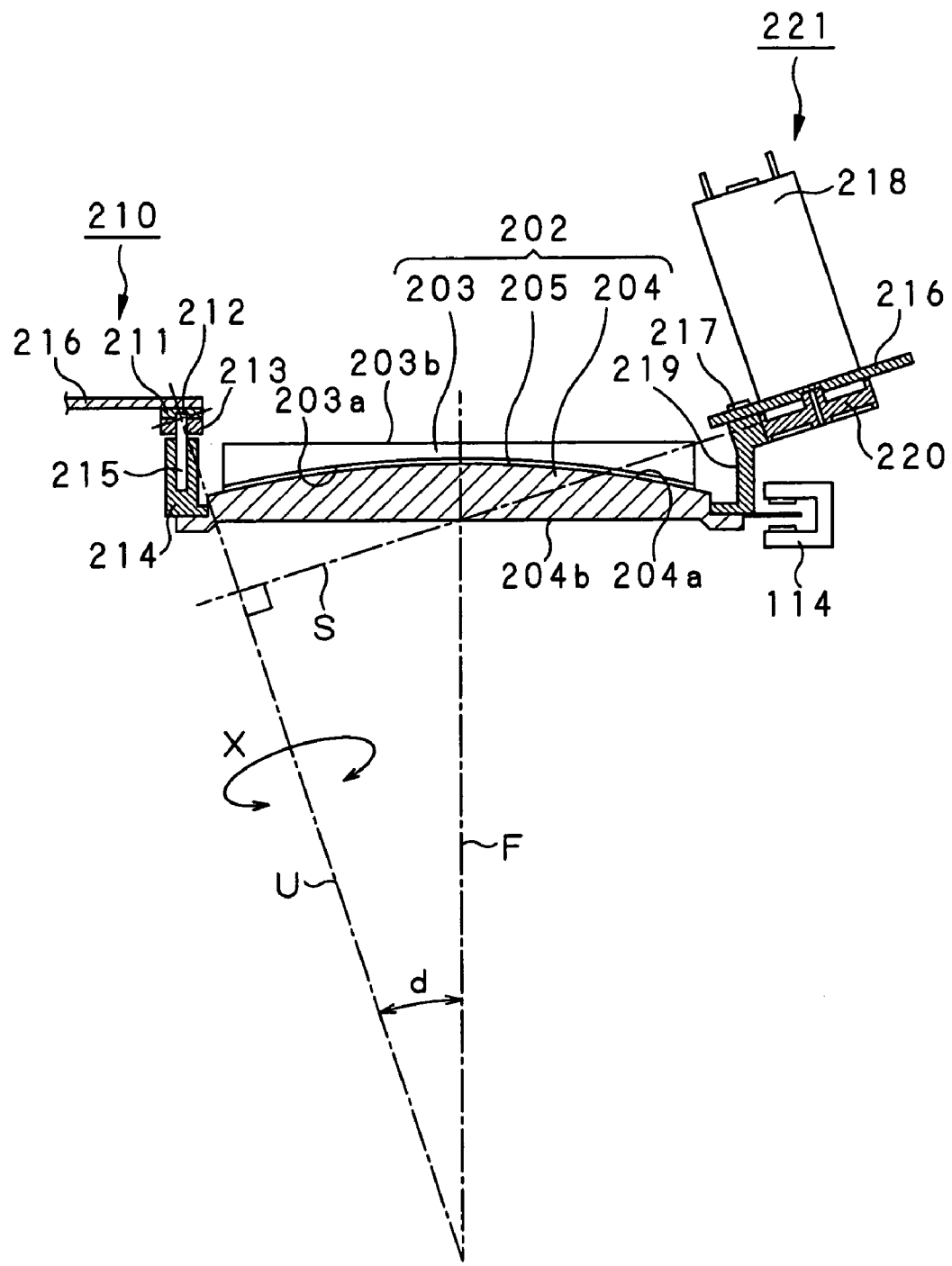
FIG. 10 is a sectional view of the operating mechanism of the tablet type VAP.

FIG. 10 shows a mechanism to rotate the plano-convex lens 204 in the tablet type VAP 202. The plano-convex lens 204 is supported by a lens support 210, and rotated about a virtual straight light U by a rotation drive 221. It should be noted that the plano-concave lens 203 is rotated by a similar mechanism. The tablet type VAP 202 is installed in a lens barrel 216 of the interchangeable lens 110.

In the lens support 210, a small ball 211 laid on the virtual axis of rotation U about which the plano-convex lens 204 is rotated is caught between a bearing fixation 212 fixed to the lens barrel 216 and a cover 213 to support the plano-convex lens 204 to be rotatable about the small ball 211. The small ball 211 is provided at the upper end of a shaft 215 press-fitted in a holder 214 installed on the plano-convex lens 204.

As above, the holder 214 is installed at the one end, at the side of the lens support 210, of the plano-convex lens 204, and a rotation-side holder 219 is installed at the end, at the side of the rotation drive 221, of the plano-convex lens 204. The rotation-side holder 219 abuts, through the intermediary of a ball bearing 217, the lens barrel 216 parallel to a plane S perpendicular to the virtual axis of rotation U about which the plano-convex lens 204 is rotated.

The rotation drive 221 includes a motor 218 to which a pulley (not shown) is installed. A steel belt (not shown) is wound on the pulley. The steel belt is wound on an arm 220 provided on the rotation-side holder 219 which holds the plano-convex lens 204. It is partially fixed to the arm 220. Therefore, as the motor 218 revolves, the pulley and steel belt are driven to move the plano-convex lens 204, held in a space by the small ball 211 and ball bearing 217 through the intermediary of the arm 220, along the plane S perpendicular to the virtual axis of rotation U.

Also, the motor 218 has provided thereon a position sensor 114b which is an optical rotary encoder to detect an angular shift which is current angle information on the plano-convex lens 204.

In case such a tablet type VAP 202 is used as the correcting optical system, a shift of the optical axis, caused by a shake of the camera system 3, can be divided into movements in two axial directions perpendicular to each other for detection, and the optical axis be shifted in the same directions as the movements. Namely, the optical-axis shifts can be corrected independently of each other without any influence on each other. Therefore, the optical-axis correcting direction should desirably be straight when projected on a plane perpendicular to the optical axis of the camera 10. To this end, the plano-convex lens 204 should be rotated about a straight line perpendicular to the optical axis.

The tablet type VAP 202 rotates about the virtual axis of rotation U not perpendicular to the optical axis to correct a camera shake. Therefore, when the movement of the tablet type VAP 202 projected on a plane perpendicular to the optical axis will depict an arc, not a straight line.

Figure 11:
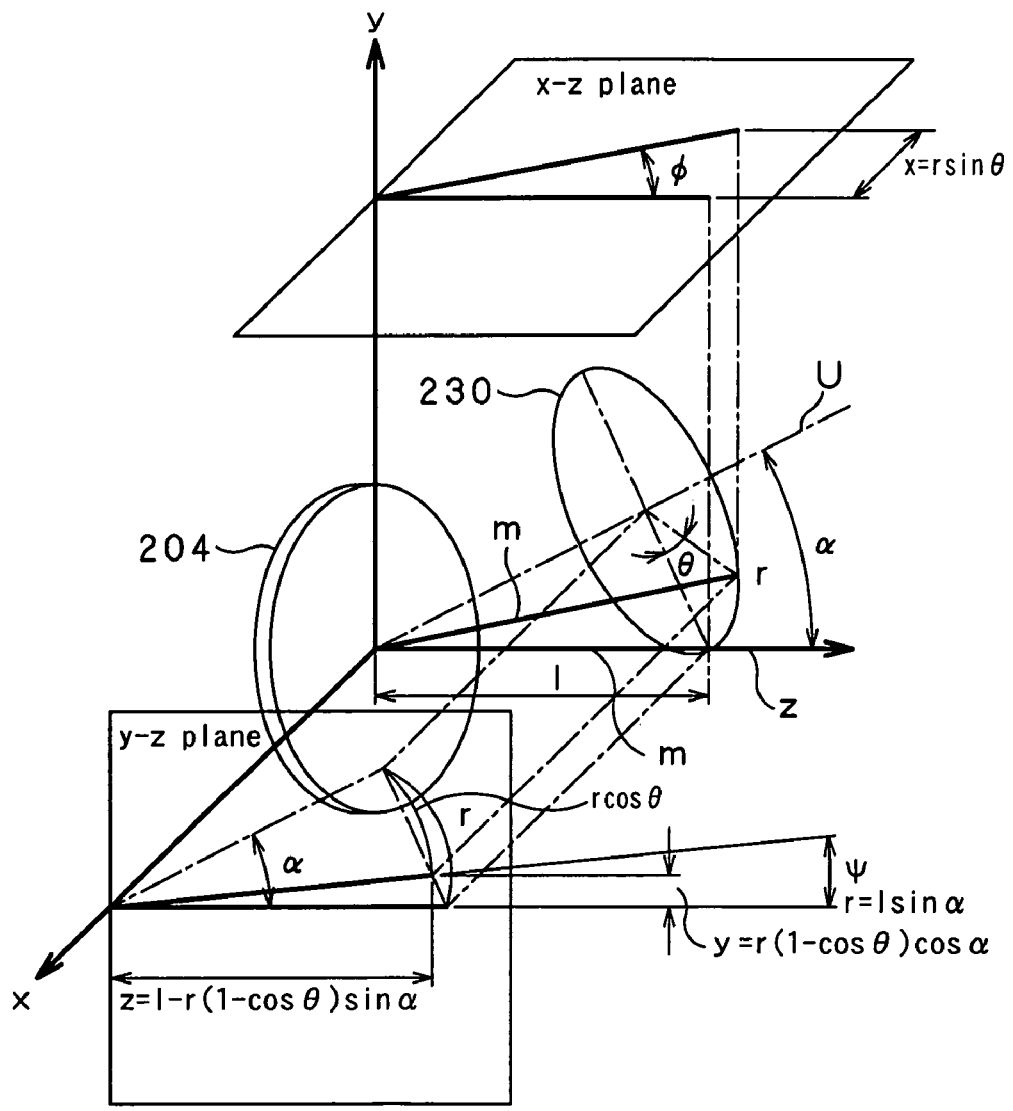
FIG. 11 shows an error component detected when the apex angle is changed in the tablet type VAP.

That is, when the tablet type VAP 202 is used to optically correct a shake of the camera 10, the shake will be optically corrected while including an error component. Such an error component can be calculated based of an orthogonal coordinate space as shown in FIG. 11. In the orthogonal coordinate space shown in FIG. 11, the direction of the optical axis of the plano-convex lens 204 when in the initial state is taken as a z-axis, a direction included in a plane perpendicular to the z-axis and including the axis of rotation of the plano-convex lens 204 is taken as a y-axis, and a direction perpendicular to the y-z plane is taken as an x-axis.

Here will be considered an orbit of a vector m normal to the plane 204b of the plano-convex lens 204, which is 1 in magnitude, when the plano-convex lens 204 is rotated about the axis of rotation U. It should be noted that an angle α is defined between the axis of rotation U and optical axis of the plano-convex lens 204.

For the convenience of the explanation, the axis of rotation U of the plano-convex lens 204 is moved in parallel to pass by the origin of the orthogonal coordinate space. In this case, the orbit of the normal vector m will be as depicted by a circle 230.

On the assumption that the plano-convex lens 204 is rotated through an angle θ about the axis of rotation U, the radius of the normal vector m is projected on x-z and y-z planes and the angles of these planes formed in relation to the z-axis are taken as φ and ψ, respectively.

On the other hand, in case the plano-convex lens 204 is rotated about a straight line parallel to the x-axis, the projection image of the normal vector m will change only in the x-z plane, not in the y-z plane. Therefore, it will be known that the angle ψ f appearing in the y-z plane is an error component.

When the plano-convex lens 204 is rotated through the angle θ about the axis of rotation U, the coordinate (x, y, z) of the radius of the normal vector m will be given as follows as shown in FIG. 11:

$x = r \sin \theta$ $y = r(1 - \cos \theta) \cos \alpha$ $z = 1 - r(1 - \cos \theta) \sin \alpha$ Therefore, the angles φ and ψ, can be given by the following equations (8) and (9), respectively:

$$\tan \phi = \frac{x}{z} = \frac{\sin \alpha \sin \theta}{1 - \sin^2 \alpha (1 - \cos \theta)}, \qquad (8)$$

$$\tan \psi = \frac{y}{z} = \frac{\sin \alpha \cos \alpha (1 - \cos \theta)}{1 - \sin^2 \alpha (1 - \cos \theta)}. \qquad (9)$$

FIG. 12 show the relation between the angles φ and ψ when the plano-convex lens 204 is rotated through the angle θ in the plane perpendicular to the axis of rotation U in case the inclinations a α in of the virtual axis of rotation U and optical axis of the plano-convex lens 204 which is in the initial state are α=20 deg. As will be seen from the illustrated relation, the angle ψ which is the error component increases in value each time the angle θ increases.

The construction of the camera 10 of the camera system 3 will be explained with reference to FIG. 8 again. The camera 10 of the camera system 3 includes a yawing-directional processing system, that is, a processing system to detect a shake in the x-z plane shown in FIG. 11 to generate angle information, and a pitching-directional processing system, that is, a processing system to detect a shake in the y-z plane shown in FIG. 11 to generate angle information.

The blocks of the yawing-directional processing system, corresponding to those in the camera 10 shown in FIG. 1 are indicated with the same reference numerals as those for the elements shown in FIG. 1, to each of which "a" is suffixed. For example, the angular velocity sensor 11 shown in FIG. 1 is indicated with a reference numeral "11*a*" in FIG. 8. Also, the blocks of the tilting-directional processing system, corresponding to those in the camera 10 shown in FIG. 1 are indicated with the same reference numerals as those for the elements shown in FIG. 1, to each of which "b" is suffixed. For example, the angular velocity sensor 111 shown in FIG. 1 is indicated with a reference numeral "11*b*" in FIG. 8.

Note that since the blocks of the yawing- and tilting-directional processing systems of the camera 10 in the camera system 3 are equal in function to those blocks of the camera 10 in the camera system 1 shown in FIG. 1, they will not be described in detail below.

The camera 10 calculates angle information σx by generating an angular velocity digital signal from an angular velocity signal which is a yawing-directional shake detected by an angular velocity sensor 11*a* by means of an HPF/LPF 12*a*, amplifier 13*a* and A-D converter 21*a* and processing it by means of a noise removing unit 22*a*, HPF 23*a* and integrating unit 24*a*. Also, the angle information σx is subjected to a predetermined processing in a centering unit 25*a* and sealing unit 26*a*.

For sending to the interchangeable lens 110, the angle information is subjected to gain processing in a gain processing unit 27*a*. The gain processing 27*a* makes such a setting that the maximum value of a transmission signal used for sending will be a maximum correction angle θx max of the interchangeable lens 110, sent from the interchangeable lens 110, and takes angle information per unit of the transmission signal used for the sending as a gain value. The gain value is sent from the terminal 30 of the camera 10 or the like to the interchangeable lens 110 when the latter is installed to the camera 10 or when the camera system is started up. The gain processing unit 27*a* sends, to the interchangeable lens 110 via a terminal 29*a*, a transmission signal corresponding to angle information obtained by dividing the angle information by the gain value. The gain value and transmission signal including the angle information are optical-correction angle information.

The camera 10 generates optical-correction angle information in exactly the same manner as above concerning a pitching-directional shake, and sends it to the interchangeable lens 110.

Next, the interchangeable lens 110 will be explained. The interchangeable lens 110 includes the above-mentioned tablet type VAP 202 as the correcting optical system. The plano-concave lens 203 in the tablet type VAP 202 in the interchangeable lens 110 is a lens which is rotated about a predetermined angle of rotation in response to a yawing-directional shake of the camera system 3 to change the apex angle of the prism, thereby correcting the shake of the camera system 3. The plano-convex lens 204 is rotated about a predetermined axis of rotation in response to a pitching-directional shake of the camera system 3 to change the apex angle of the prism, thereby correcting the shake of the camera system 3. In the plano-concave and -convex lenses 203 and 204, their respective axes of rotation and optical axes form angles α and β. It should be noted that the tablet VAP 202 may be made with the plano-concave and -convex lenses 203 and 204 being disposed for the angles α and β to be equal to each other.

With the drive systems of the plano-concave and -convex lenses 203 and 204 being operated under the control of the lens microcomputer 120, the plano-concave and -convex lenses 203 and 204 allow the tablet type VAP 202 to function as a correcting optical system.

An x-axis calculation unit 121*a* of the lens microcomputer 120 is supplied with the transmission signal as optical-correction angle information sent from the camera 10 via a terminal 117*a*. The x-axis calculation unit 121*a* calculates angle information by multiplying the sent transmission signal by the gain value having already been set. Further, the x-axis calculation unit 121*a* calculates a control target value of the apex angle based on the calculated angle information and the aforementioned equation (7). Further, the x-axis calculation unit 121*a* calculates a target angular shift of the angle of rotation of the plano-concave lens 203 about the axis of rotation on the basis of the aforementioned equation (8).

Near a motor 113*a* to rotate the plano-concave lens 203, there is provided a rotation angle sensor 114*a* for the plano-concave lens 203. The rotation angle sensor 114*a* detects an angular shift θx, namely, how much the plano-concave lens 203 has been rotated with the rotation of the motor 113*a*. The angular shift θx is amplified by the amplifier 115*a* to a predetermined level, converted by the A-D converter 116*a* into digital data, and supplied to an adder 122*a* of the lens microcomputer 120. The adder 122*a* subtracts the angular shift θx from the target angular shift calculated by the x-axis calculation unit 121*a* to generate a control signal.

The drive circuit 112*a* is supplied with a control signal generated by the lens microcomputer 120 and converted by a D-A converter 111*a* into an analog value. The drive circuit 112*a* converts the supplied control signal into a control voltage which is to be applied to the motor 113*a*.

The plano-concave lens 203 is rotated by the motor 113*a* controlled by the drive circuit 112*a* for the tablet type VAP 202 to have an appropriate apex angle to correct the optical axis.

Thus, the plano-concave lens 203 is subjected to feedback control of the lens microcomputer 120 to correct a yawing-directional shake.

The plano-convex lens 204 is also subject to such a feedback control in exactly the same manner to correct a pitching-directional shake.

As having been described above, it is known that the tablet type VAP 202 incurs an error at the time of rotation because neither of the plano- and -convex lenses 203 and 204 in the tablet type VAP 202 is not be rotated about any axis perpendicular to the optical axis. Therefore, the lens microcomputer 120 of the interchangeable lens 110 has a function to remove the error.

Here the error component of the plano-concave lens 203 will be considered. When the plano-concave lens 203 is rotated through an angle θx in a plane perpendicular to the axis of the lens rotation, the θx-caused angle ψx of rotation in the y-z plane will be as given by the following equation (10) on the basis of the equation (9):

$$\tan\psi x = \frac{\sin\alpha\cos\alpha(1-\cos\theta x)}{1-\sin^2\alpha(1-\cos\theta x)}. \qquad (10)$$

To correct the error component, the plano-convex lens 204 being another lens included in the tablet type VAP 202 should be rotated so that an angle $\phi y$ projected in the y-z plane when the lens is rotated through $\Delta\theta y$ about the axis of lens rotation will cancel the angle of rotation $\psi x$ which is the error component. The angle of rotation $\phi y$ when the plano-convex lens 204 is rotated through $\Delta\theta y$ will be as given by the following equation (11) on the basis of the equation (8):

$$\tan\phi x = \frac{\sin\alpha\sin\theta}{1-\sin^2\alpha(1-\cos\theta)}. \qquad (11)$$

Therefore, by determining $\Delta\theta y$ which meets a requirement that the equation (11) should be equal to the equation (10), there will be determined an angle of rotation $\Delta\theta y$ of the plano-convex lens 204, which corrects an error component taking place due to rotation of the plano-concave lens 203. The angle of rotation $\Delta\theta y$ determined to meet the above requirement will be as given by the following equation (12):

$$\Delta\theta y \approx \frac{\cos\alpha\cdot\sin\alpha}{2\sin\beta}\cdot\theta^2 x. \qquad (12)$$

Similarly, an angle of rotation $\Delta\theta x$ of the plano-concave lens 203 to cancel an error component taking plane when the plano-convex lens 204 is rotated in a plane perpendicular to the axis of rotation will be as given by the following equation (13):

$$\Delta\theta x \approx \frac{\cos\alpha\cdot\sin\beta}{2\sin\alpha}\cdot\theta^2 y. \qquad (13)$$

In case the angle $\alpha$ defined between the axis of rotation and optical axis of the piano-concave lens 203 is the same as the angle $\beta$ defined between the axis of rotation and optical axis of the plano-convex lens 204, the above equations (12) and (13) will be as given by the following equations (14) and (15), respectively:

$$\Delta\theta y \approx \frac{1}{2}\cos\alpha\cdot\theta^2 x, \qquad (14)$$

$$\Delta\theta x \approx \frac{1}{2}\cos\alpha\cdot\theta^2 y. \qquad (15)$$

The lens microcomputer 120 includes an error correction unit 123*a* to correct an error component caused by the aforementioned plano-concave lens 203, and an error correction unit 123*b* to correct an error component caused by the aforementioned plano-convex lens 204.

The error correction unit 123*b* calculates, using the equation (15), an error correction angle of rotation $\Delta\theta x$ from the angle of rotation $\theta y$ of the plano-convex lens 204, detected by the position sensor 114*b*, and supplies it to the x-axis calculation unit 121*a*.

Correspondingly, the x-axis calculation unit 121*a* adds the supplied error correction angle of rotation $\Delta\theta x$ to the control target value, and supplies the result of addition to an adder 122*a* provided downstream.

Similarly, the error correction unit 123*a* also calculates, using the equation (14), an error correction angle of rotation $\Delta\theta y$ from the angle of rotation $\theta x$ of the plano-concave lens 203, detected by the position sensor 114*a*, and supplies it to a y-axis calculation unit 121*b*.

Correspondingly, the y-axis calculation unit 121*b* adds the supplied error correction angle of rotation $\Delta\theta y$ to the control target value, and supplies the result of addition to an adder 122*b* provided downstream.

Thus, the camera system 3 can accurately correct a shake applied thereto by supplying the optical-correction angle information from the camera 10 to the interchangeable lens 110 including the tablet type VAP 202.

As described above, in the camera systems 1, 2 and 3 as the first to third embodiments, respectively, of the present invention, the camera 10 as the camera body calculates angle information from the angular velocity information detected by the angular velocity sensor 11 (angular velocity sensors 11*a* and 11*b*) provided in the camera 10, sends the same information as optical-correction angle information to the interchangeable lens 40, 70 or 110 of which the correcting optical systems are different from each other.

On the other hand, the interchangeable lens 40, 70 or 110 installed to the camera 10 generates a control signal corresponding to the correcting optical system thereof based on the optical-correction angle information to make shake correction by the correcting optical system such as the shift lens or VAP, for example.

Therefore, whichever technique the interchangeable lens installed to the camera 10 adopts, any of all the existing shake correcting technique or a shake correction technique based on a new principle, the camera 10 can make shake correction by sending the optical-correction angle information to the interchangeable lens. Since the camera 10 has thus a higher versatility for the correcting optical system, its expansibility as a camera system is highly expectable.

The present invention is not limited to any type of camera but can be applied to a still camera which optically images an object on a so-called silver film, video camera which images an object, digital still camera which images an object as a digital still image, digital video camera which images an object as a digital video, etc.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, according to the present invention, correction angle information calculated by a camera is sent to an interchangeable lens and an angular shift of a camera system is optically corrected based on the correction angle information sent to the interchangeable lens. So, even in case another interchangeable lens different in correcting optical system is used, a control signal can be generated in the interchangeable lens correspondingly to the correction angle information sent from the camera and on the basis of the principle and drive mechanism of the correcting optical system adopted in the interchangeable lens. Therefore, positive shake correction is possible with the interchangeable lens using any correcting optical system based on an existing principle of shake correction or any correcting optical system based on a new principle of shake correction.

Also, according to the present invention, the correction angle information is converted into a transmission signal to be sent from the camera to the interchangeable lens so that the maximum value of the transmission signal will be maximum correction angle information generated in the interchangeable lens and which is an angular shift taking correctable by an optical correcting means, which assures to send the correction angle information with a high accuracy.

The invention claimed is:

1. A camera system including an interchangeable lens having an optical correction means for optically correcting an optical axis varied by a shake and a camera to which the interchangeable lens is to be installed, wherein:
the camera includes:
a first reception means for receiving current-position information based upon and indicative of a correction angle of said optical correction means within a range of angles permitting optical correction;
an angular shift detection means for outputting angular shift information regarding an imaging angle of said camera varied by the shake;
an optical-correction angle information calculation means for calculating optical-correction angle information including information based on a maximum correction angle for the interchangeable lens to be conveyed to said optical correction means based on the current-position information and the angular shift information,
wherein the optical-correction angle information calculation means includes a centering unit for adjusting the optical-correction angle information so that the optical-correction angle information is within a range of angles that can be corrected by the optical correction means; and
a first sending means for sending the optical-correction angle information to the interchangeable lens, and
the interchangeable lens includes:
a second reception means for receiving and inputting the optical-correction angle information to said optical correction means; and
a second sending means for sending the current-position information of said optical correction means to said camera; and
said optical correction means optically correcting the optical axis so that the current-position information may approach a control target value provided by the correction angle information.

2. The camera system according to claim 1, wherein the angular shift detection means comprises an angular velocity sensor for detecting an angular shift as to the imaging angle of the camera, and
the optical-correction angle information calculation means calculates the optical-correction angle information from the angular shift detected by the angular velocity sensor.

3. The camera system according to claim 1, wherein the camera further comprises a transmission signal converting means for converting the optical-correction angle information calculated by the optical-correction angle information calculating means into a predetermined transmission signal, the first sending means sending the optical-correction angle information to the interchangeable lens by the predetermined transmission signal from the transmission signal converting means.

4. The camera system according to claim 1, wherein:
the interchangeable lens comprises:
a maximum optical-correction angle information calculating means for calculating maximum optical-correction angle information that is an angular shift correctable by the optical-correcting means; and
a second sending means for sending the maximum optical-correction angle information calculated by the maximum optical-correction angle information calculating means to the camera, and
the transmission signal converting means in the camera converts the optical-correction angle information calculated by the optical-correction angle information calculating means into the predetermined transmission signal so that the maximum optical-correction information sent by the second sending means in the interchangeable lens takes a maximum value of the predetermined transmission signal the first sending means can send.

5. The camera system according to claim 4, wherein:
the transmission signal converting means in the camera calculates the optical-correction angle information per unit of the predetermined transmission signal as a gain value; and
the camera includes a third sending means for sending the gain value calculated by the transmission signal converting means to the interchangeable lens.

6. The camera system according to claim 5, wherein:
the transmission signal converting means in the camera calculates a new gain value even while the first sending means is sending the predetermined transmission signal and converts the optical-correction angle information calculated by the optical-correction angle information calculating means on the basis of the new gain value thus calculated, and
the third sending means in the camera sends the new gain value calculated by the transmission signal converting means to the interchangeable lens.

7. The camera system according to claim 1, wherein the optical correcting means in the interchangeable lens is a liquid-filled variable angle prism and optically corrects the angular shift by changing the apex angle thereof on the basis of the optical-correction angle information.

8. The camera system according to claim 1, wherein the optical correcting means in the interchangeable lens is a variable angle prism including first and second spherical lenses opposite at their spherical surfaces to each other and optically corrects the angular shift by rotating at least one of the first and second spherical lenses along the spherical surfaces in relation to the other lens on the basis of the optical-correction angle information to change an apex angle formed between the first and second spherical lenses.

9. A camera system including an interchangeable lens having an optical correction means for optically correcting an optical axis varied by a shake and a camera to which the interchangeable lens is to be installed, wherein:
the camera includes:
a first reception means for receiving current-position information regarding a correction angle of said optical correction means;
an angular shift detection means for outputting angular shift information regarding an imaging angle of said camera varied by the shake;
an optical-correction angle information calculation means for calculating optical-correction angle information including information based on a maximum correction angle for the interchangeable lens to be conveyed to said optical correction means based on the current-position information and the angular shift information; and a first sending means for sending the optical-correction angle information to the interchangeable lens, and the interchangeable lens includes:

a second reception means for receiving and inputting the optical-correction angle information to said optical correction means; and a second sending means for sending the current-position information of said optical correction means to said camera; and said optical correction means optically correcting the optical axis so that the current-position information may approach a control target value provided by the optical-correction angle information, wherein the optical correcting means in the interchangeable lens is a variable angle prism including first and second spherical lenses opposite at their spherical surfaces to each other and optically corrects the angular shift by rotating at least one of the first and second spherical lenses along the spherical surfaces in relation to the other lens on the basis of the optical-correction angle information to change an apex angle formed between the first and second spherical lenses, and wherein on the assumption that an angle formed between the axis of rotation and optical axis of the first spherical lens is α, an angle formed between the axis of rotation and optical axis of the second spherical lens is β, and angles of rotation of the lenses in planes normal to the axes of the lenses are θx and θy, respectively, the optical correcting means in the interchangeable lens makes shake correction by rotating the second spherical lens through an angle Δθy given as follows when the angle of rotation of the first spherical lens has been adjusted on the basis of the angular shift information detected by the angular shift detection means:

$$\Delta\theta y \approx \frac{\cos\alpha \cdot \sin\alpha}{2\sin\beta} \cdot \theta^2 x$$

and by rotating the first spherical lens through an angle Δθx given as follows when the angle of rotation-ψ of the second spherical lens has been adjusted on the basis of the angular shift information detected by the angular shift detection means:

$$\Delta\theta x \approx \frac{\cos\alpha \cdot \sin\beta}{2\sin\alpha} \cdot \theta^2 y.$$

10. The camera system according to claim 9, wherein the optical correcting means in the interchangeable lens selects correction angles of rotation Δθx and Δθy given as follows when the selected angles α and β in relation to the optical axis are equal to each other:

$$\Delta\theta y \approx \frac{1}{2}\cos\alpha \cdot \theta^2 x$$

$$\Delta\theta x \approx \frac{1}{2}\cos\alpha \cdot \theta^2 y.$$

11. The cameral system according to claim 1, wherein the optical correcting means in the interchangeable lens is a shift lens provided on the optical imaging means and optically corrects the angular shift by shifting the shift lens in two directions perpendicular to the optical axis on the basis of the optical-correction angle information.

12. A camera system including an interchangeable lens having an optical correction means for optically correcting an optical axis varied by a shake and a camera to which the interchangeable lens is to be installed, wherein:

the camera includes:

a first reception means for receiving current-position information regarding a correction angle of said optical correction means;

an angular detection means for outputting angular shift information regarding an imaging angle of said camera varied by the shake;

a optical-correction angle information calculation means for calculating optical-correction angle information including information based on a maximum correction angle for the interchangeable lens to be conveyed to said optical correction means based on the current-position information and the angular shift information; and a first sending means for sending the optical-correction angle information to the interchangeable lens, and the interchangeable lens includes:

a second reception means for receiving and inputting the optical-correction angle information to said optical correction means; and a second sending means for sending the current-position information of said optical correction means to said camera; and said optical correction means optically correcting the optical axis so that the current-position information may approach a control target value provided by the optical-correction angle information, wherein the optical correcting means in the interchangeable lens is a shift lens provided on the optical imaging means and optically corrects the angular shift by shifting the shift lens in two directions perpendicular to the optical axis on the basis of the optical-correction angle information, and wherein the interchangeable lens has:

a maximum correction angle calculating means for calculating a maximum correction angle θmax from a focal distance f and imaging magnification k of the optical imaging means and a maximum shiftable distance dmax and sensitivity to decentering Sd(f, k) of the shift lens by the following equation:

θmax=dmax·Sd(f,k)/{f(1+k)} and a fourth sending means for sending a maximum correction angle θmax calculated by the maximum correction angle calculating means to the camera.

13. A camera to which an interchangeable lens having an optical correction means for optically correcting an optical axis varied by a shake is to be installed, wherein the camera includes:

a first reception means for receiving current-position information based upon and indicative of an optical-correction angle of said optical correction means on said interchangeable lens in a range of angles permitting optical correction;

an angular shift detection means for outputting angular shift information regarding an imaging angle of said camera varied by a shake;

an optical-correction angle information calculating means for calculating optical-correction angle information to be conveyed to said optical correction means based on current-position information and the angular shift information,
wherein the optical-correction angle information calculation means includes a centering unit for adjusting the optical-correction angle information so that the optical-correction angle information is within a range of angles that can be corrected by the optical correction means; and
a first sending means for sending the optical-correction angle information to the interchangeable lens.

14. The camera according to claim 13, wherein the camera further annular shift detection means comprises an angular velocity sensor for detecting an angular shift as to the imaging angle of the camera, and
the correction angle calculation means calculates the optical-correction angle information from the angular shift detected by the imaging direction sensor.

15. The camera according to claim 13, further comprising a transmission signal converting means for converting the optical-correction angle information calculated by the optical-correction angle information calculating means into a transmission signal,
the first sending means sending the optical-correction angle information to the interchangeable lens by the transmission signal from the transmission signal converting means.

16. The camera according to claim 15, wherein the transmission signal converting means converts the optical-correction angle information calculated by the optical-correction angle information calculating means into the transmission signal so that the optical-correction angle information sent by the first sending means in the interchangeable lens takes a maximum value of the transmission signal the first sending means can send.

17. The camera according to claim 16, wherein:
the transmission signal converting means calculates the optical-correction angle information per unit of the predetermined transmission signal as a gain value; and
there is provided a second sending means for sending the gain value calculated by the transmission signal converting means to the interchangeable lens.

18. The camera according to claim 17, wherein:
the transmission signal converting means calculates a new gain value even while the first sending means is sending the predetermined transmission signal and converts the optical-correction angle information calculated by the optical-correction angle information calculating means on the basis of the new gain value thus calculated, and
the second sending means sends the new gain value calculated by the transmission signal converting means to the interchangeable lens.

19. An interchangeable lens having an optical correction means for optically correcting an optical axis varied by a shake and which is to be installed to a predetermined camera, wherein the interchangeable lens includes:
a reception means for receiving and inputting the optical-correction angle information sent from the camera to said optical correction means; and
an optical correction means optically correcting the optical axis so that the current-position information may approach a control target value provided by the optical-correction angle information,
wherein the optical correcting means is a liquid-filled variable angle prism and optically corrects the angular shift by changing the apex angle thereof on the basis of the optical-correction angle information,
wherein the optical correcting means is a variable angle prism including first and second spherical lenses opposite at their spherical surfaces to each other and optically corrects the angular shift by rotating at least one of the first and second spherical lenses along the spherical surfaces in relation to the other lens on the basis of the optical-correction angle information to change an apex angle formed between the first and second spherical lenses, and
wherein on the assumption that an angle formed between the axis of rotation and optical axis of the first spherical lens is $\alpha$, an angle formed between the axis of rotation and optical axis of the second spherical lens is $\beta$, and angles of rotation of the lenses in planes normal to the axes of the lenses are $\theta x$ and $\theta y$, respectively, the optical correcting means makes shake correction by rotating the second spherical lens through an angle $\Delta\theta y$ given as follows when the angle of rotation $\phi$ of the first spherical lens has been adjusted on the basis of the angular shift information detected by the angular shift detection means:

$$\Delta\theta y \approx \frac{\cos\alpha \cdot \sin\alpha}{2\sin\beta} \cdot \theta^2 x$$

and by rotating the first spherical lens through an angle $\Delta\theta x$ given as follows when the angle of rotation-$\psi$ of the second spherical lens has been adjusted on the basis of the angular shift information detected by the angular shift detection means:

$$\Delta\theta x \approx \frac{\cos\alpha \cdot \sin\beta}{2\sin\alpha} \cdot \theta^2 y.$$

20. The interchangeable lens according to claim 19, wherein the optical correcting means selects correction angles of rotation $\Delta\theta x$ and $\Delta\theta y$ given as follows when the selected angles $\alpha$ and $\beta$ in relation to the optical axis are equal to each other:

$$\Delta\theta y \approx \frac{1}{2}\cos\alpha \cdot \theta^2 x$$

$$\Delta\theta x \approx \frac{1}{2}\cos\alpha \cdot \theta^2 y.$$

21. An interchangeable lens having an optical correction means for optically correcting an optical axis varied by a shake and which is to be installed to a predetermined camera, wherein the interchangeable lens includes:
a reception means for receiving and inputting the optical-correction angle information sent from the camera to said optical correction means; and
an optical correction means optically correcting the optical axis so that the current-position information may approach a control target value provided by the optical-correction angle information,
wherein the optical correcting means is a shift lens provided on the optical imaging means and optically corrects the angular shift by shifting the shift lens in two directions perpendicular to the optical axis on the basis of the optical-correction angle information, and further comprising:

a maximum correction angle calculating means for calculating a maximum correction angle θmax from a focal distance f and imaging magnification k of the optical imaging means and a maximum shiftable distance dmax and sensitivity to decentering Sd(f, k) of the shift lens by the following equation:

θmax=dmax·Sd(f,k)/{f(1+k)} and a second sending means for sending a maximum correction angle θmax calculated by the maximum correction angle calculating means to the camera.

22. A camera system including an interchangeable lens having an optical imaging means for imaging an object and a camera to which the interchangeable lens is to be installed, wherein:

the camera comprises:

an optical-correction angle information calculating means for calculating optical-correction angle information including information based on a maximum correction angle for the interchangeable lens; and a first sending means for sending the optical-correction angle information calculated by the optical-correction angle information calculating means to the interchangeable lens, and the interchangeable lens comprises:

an optical correcting means for optically correcting an angular shift of the camera system on the basis of the optical-correction angle information sent from the first sending means, wherein on the assumption that an angle formed between the axis of rotation and optical axis of a first spherical lens is α, an angle formed between the axis of rotation and optical axis of a second spherical lens is β, and angles of rotation of the lenses in planes normal to the axes of the lenses are θx and θy, respectively, the optical correcting means in the interchangeable lens makes shake correction by rotating the second spherical lens through an angle Δθx given as follows when the angle of rotation of the first spherical lens has been adjusted on the basis of the angular shift information detected by the angular shift detection means:

$$\Delta\theta y \approx \frac{\cos\alpha \cdot \sin\alpha}{2\sin\beta} \cdot \theta^2 x$$

and by rotating the first spherical lens through an angle Δθy given as follows when the angle of rotation ψ of the second spherical lens has been adjusted on the basis of the angular shift information detected by the angular shift detection means:

$$\Delta\theta x \approx \frac{\cos\alpha \cdot \sin\beta}{2\sin\alpha} \cdot \theta^2 y.$$

23. The camera system according to claim 22, wherein the angular shift detection means comprises an angular velocity sensor for detecting an angular shift as to the imaging angle of the camera, and the optical-correction angle information calculating means calculates the optical-correction angle information from the angular shift detected by the angular velocity sensor.

24. The camera system according to claim 22, wherein the camera further comprises a transmission signal converting means for converting the optical-correction angle information calculated by the optical-correction angle information calculating means into a predetermined transmission signal, the first sending means sending the optical-correction angle information to the interchangeable lens by the predetermined transmission signal from the transmission signal converting means.

25. The camera system according to claim 22, wherein:

the interchangeable lens comprises:

a maximum optical-correction angle information calculating means for calculating maximum optical-correction angle information that is an angular shift correctable by the optical-correcting means; and a second sending means for sending the maximum optical-correction angle information calculated by the maximum optical-correction angle information calculating means to the camera, and the transmission signal converting means in the camera converts the optical-correction angle information calculated by the optical-correction angle information calculating means into the predetermined transmission signal so that the maximum optical-correction information sent by the second sending means in the interchangeable lens takes a maximum value of the predetermined transmission signal the first sending means can send.

26. The camera system according to claim 25, wherein:

the transmission signal converting means in the camera calculates the optical-correction angle information per unit of the predetermined transmission signal as a gain value; and the camera includes a third sending means for sending the gain value calculated by the transmission signal converting means to the interchangeable lens.

27. The camera system according to claim 26, wherein:

the transmission signal converting means in the camera calculates a new gain value even while the first sending means is sending the predetermined transmission signal and converts the optical-correction angle information calculated by the optical-correction angle information calculating means on the basis of the new gain value thus calculated, and the third sending means in the camera sends the new gain value calculated by the transmission signal converting means to the interchangeable lens.

28. The camera system according to claim 22, wherein the optical correcting means in the interchangeable lens is a liquid-filled variable angle prism and optically corrects the angular shift by changing the apex angle thereof on the basis of the optical-correction angle information.

29. The camera system according to claim 22, wherein the optical correcting means in the interchangeable lens is a variable angle prism including first and second spherical lenses opposite at their spherical surfaces to each other and optically corrects the angular shift by rotating at least one of the first and second spherical lenses along the spherical surfaces in relation to the other lens on the basis of the optical-correction angle information to change an apex angle formed between the first and second spherical lenses.

30. The camera system according to claim 22, wherein the optical correcting means in the interchangeable lens selects correction angles of rotation Δθx and Δθy given as follows when the selected angles α and β in relation to the optical axis are equal to each other:

$$\Delta\theta y \approx \frac{1}{2}\cos\alpha \cdot \theta^2 x$$

$$\Delta\theta x \approx \frac{1}{2}\cos\alpha \cdot \theta^2 y.$$

31. A camera system including an interchangeable lens having an optical imaging means for imaging an object and a camera to which the interchangeable lens is to be installed, wherein:

the camera comprises:

an optical-correction angle information calculating means for calculating optical-correction angle information including information based on a maximum correction angle for the interchangeable lens; and a first sending means for sending the optical-correction angle information calculated by the optical-correction angle information calculating means to the interchangeable lens, and the interchangeable lens comprises:

an optical correcting means for optically correcting an angular shift of the camera system on the basis of the optical-correction angle information sent from the first sending means, wherein the optical correcting means in the interchangeable lens is a shift lens provided on the optical imaging means and optically corrects the angular shift by shifting the shift lens in two directions perpendicular to the optical axis on the basis of the optical-correction angle information, and wherein the interchangeable lens has:

a maximum correction angle calculating means for calculating a maximum correction angle θmax from a focal distance f and imaging magnification k of the optical imaging means and a maximum shiftable distance dmax and sensitivity to decentering Sd(f, k) of the shift lens by the following equation:

θmax=dmax·Sd(f,k)/{f(1+k)} and a fourth sending means for sending a maximum correction angle θmax calculated by the maximum correction angle calculating means to the camera.

32. An interchangeable lens having an optical imaging means for imaging an object and which is to be installed to a predetermined camera, comprising:

a receiving means for receiving optical-correction angle information sent from the camera; and an optical correcting means for optically correcting an angular shift of the camera on the basis of the optical-correction angle information received by the receiving means, wherein on the assumption that an angle formed between the axis of rotation and optical axis of the first spherical lens is α, an angle formed between the axis of rotation and optical axis of the second spherical lens is β, and angles of rotation of the lenses in planes normal to the axes of the lenses are θx and θy, respectively, the optical correcting means makes shake correction by rotating the second spherical lens through an angle Δθy given as follows when the angle of rotation φ of the first spherical lens has been adjusted on the basis of the angular shift information detected by the angular shift detection means:

$$\Delta\theta y \approx \frac{\cos\alpha \cdot \sin\alpha}{2\sin\beta} \cdot \theta^2 x$$

and by rotating the first spherical lens through an angle Δθx given as follows when the angle of rotation-ψ of the second spherical lens has been adjusted on the basis of the angular shift information detected by the angular shift detection means:

$$\Delta\theta x \approx \frac{\cos\alpha \cdot \sin\beta}{2\sin\alpha} \cdot \theta^2 y.$$

33. The interchangeable lens according to claim 32, further comprising:

a maximum optical-correction angle information calculating means for calculating maximum optical-correction angle information that is an angular shift correctable by the optical-correcting means; and there is provided a first sending means for sending the maximum optical-correction angle information calculated by the maximum optical-correction angle information calculating means to the camera.

34. The interchangeable lens according to claim 32, wherein the optical correcting means is a liquid-filled variable angle prism and optically corrects the angular shift by changing the apex angle thereof on the basis of the optical-correction angle information.

35. The interchangeable lens according to claim 32, wherein the optical correcting means is a variable angle prism including first and second spherical lenses opposite at their spherical surfaces to each other and optically corrects the angular shift by rotating at least one of the first and second spherical lenses along the spherical surfaces in relation to the other lens on the basis of the optical-correction angle information to change an apex angle formed between the first and second spherical lenses.

36. The interchangeable lens according to claim 32, wherein the optical correcting means selects correction angles of rotation Δθx and Δθy given as follows when the selected angles α and β in relation to the optical axis are equal to each other:

$$\Delta\theta y \approx \frac{1}{2}\cos\alpha \cdot \theta^2 x$$

$$\Delta\theta x \approx \frac{1}{2}\cos\alpha \cdot \theta^2 y.$$

37. An interchangeable lens having an optical imaging means for imaging an object and which is to be installed to a predetermined camera, comprising:

a receiving means for receiving optical-correction angle information sent from the camera; and an optical correcting means for optically correcting an angular shift of the camera on the basis of the optical-correction angle information received by the receiving means, wherein the optical correcting means is a shift lens provided on the optical imaging means and optically corrects the angular shift by shifting the shift lens in two directions perpendicular to the optical axis on the basis of the optical-correction angle information, and further comprising:

a maximum correction angle calculating means for calculating a maximum correction angle θmax from a focal distance f and imaging magnification k of the optical imaging means and a maximum shiftable distance dmax and sensitivity to decentering Sd(f, k) of the shift lens by the following equation:

$$\theta max = dmax \cdot Sd(f,k)/\{f(1+k)\}$$

and a second sending means for sending a maximum correction angle θmax calculated by the maximum correction angle calculating means to the camera.

* * * * *